W. F. SIMPSON.
MACHINE FOR CUTTING SHEET FORM MATERIAL.
APPLICATION FILED APR. 7, 1915.
1,208,847.
Patented Dec. 19, 1916.
7 SHEETS—SHEET 1.
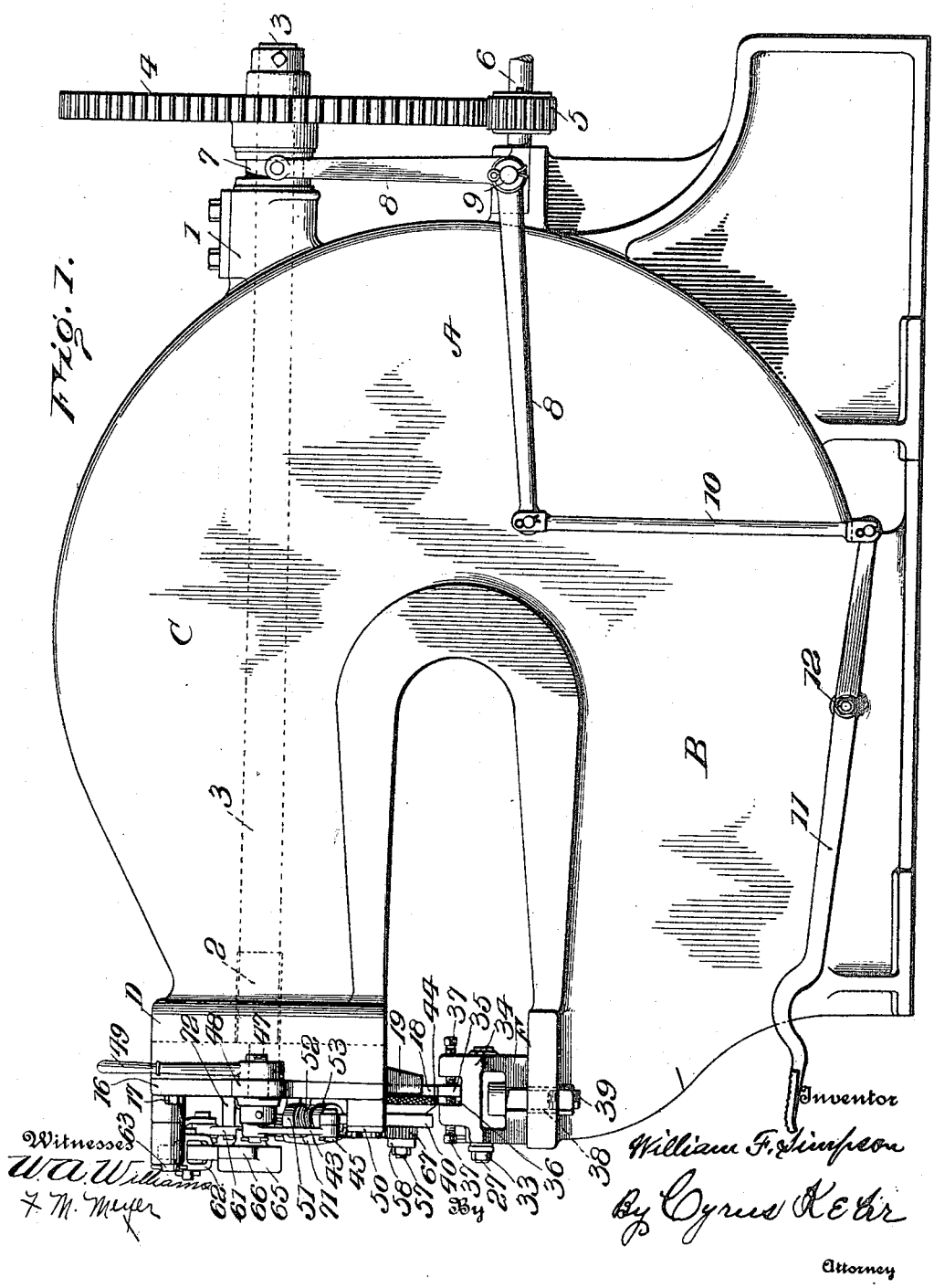

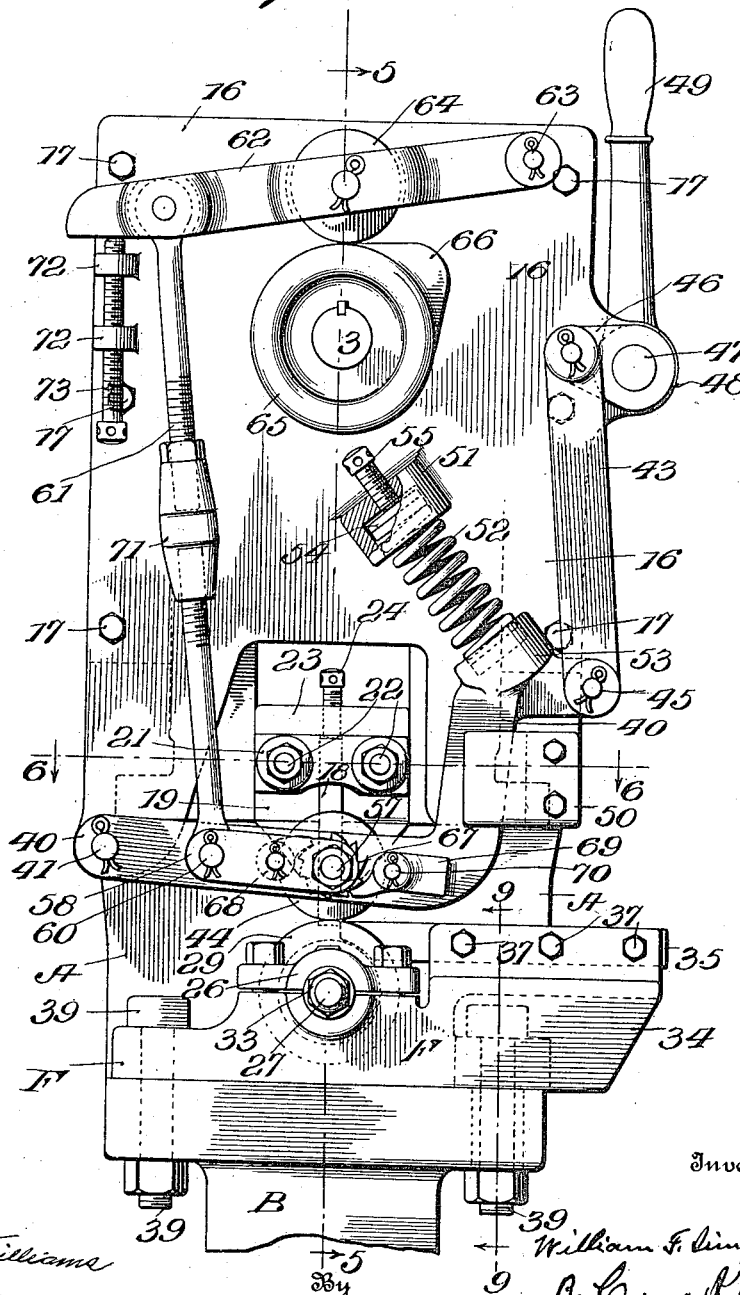

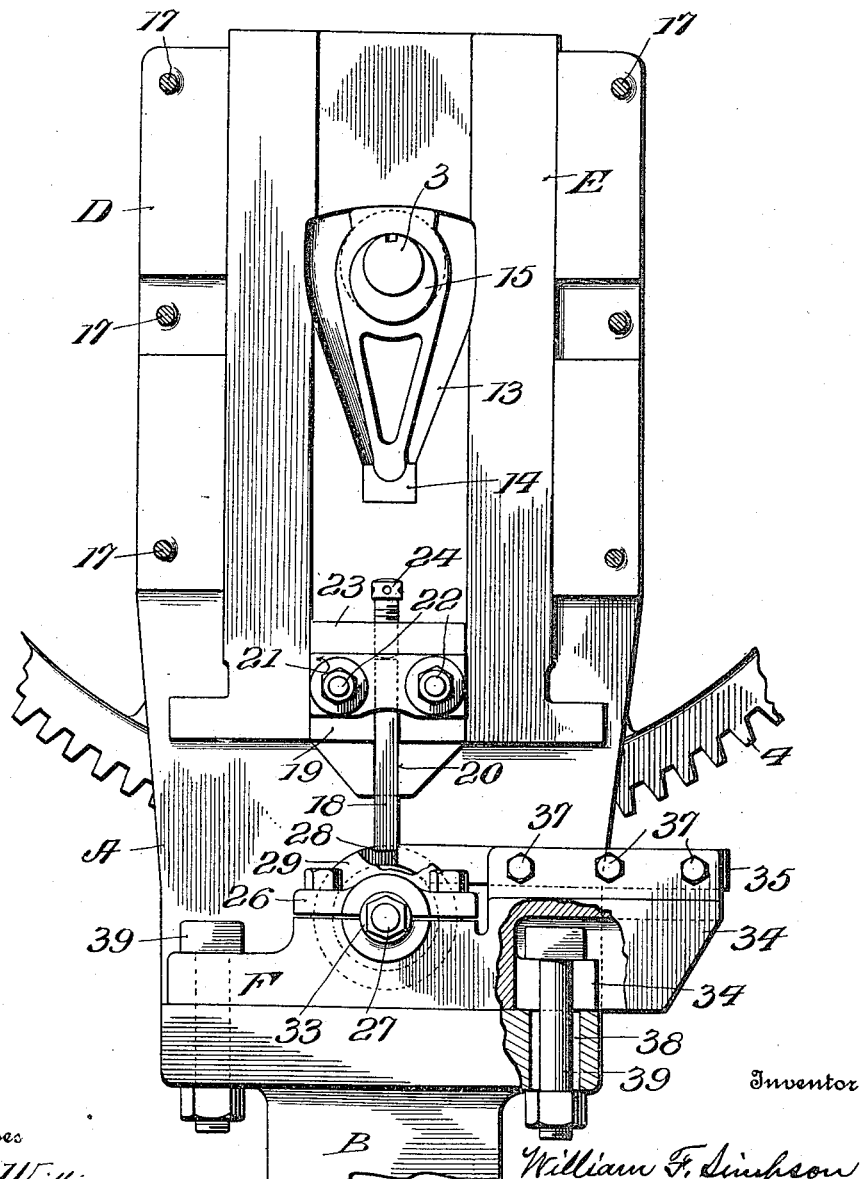

W. F. SIMPSON.
MACHINE FOR CUTTING SHEET FORM MATERIAL.
APPLICATION FILED APR. 7, 1915.
1,208,847.
Patented Dec. 19, 1916.
7 SHEETS—SHEET 4.
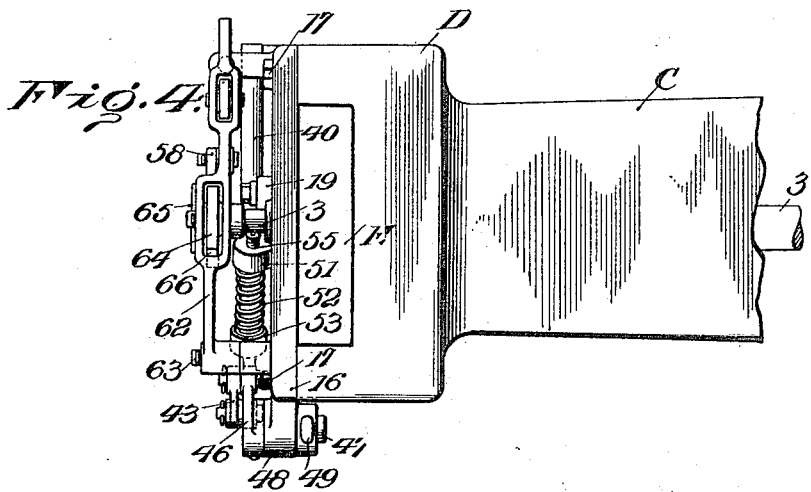
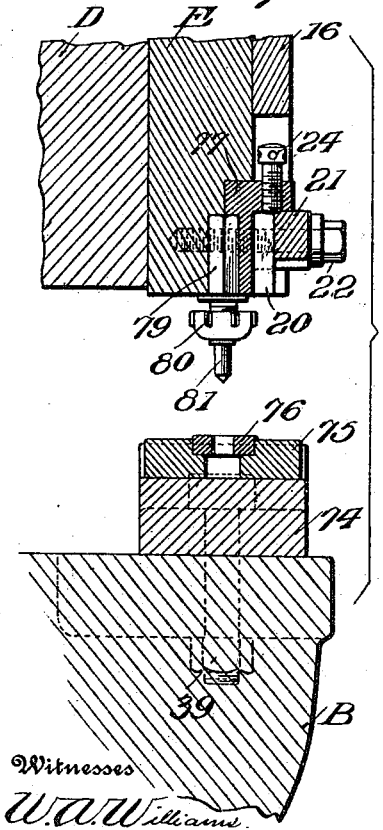
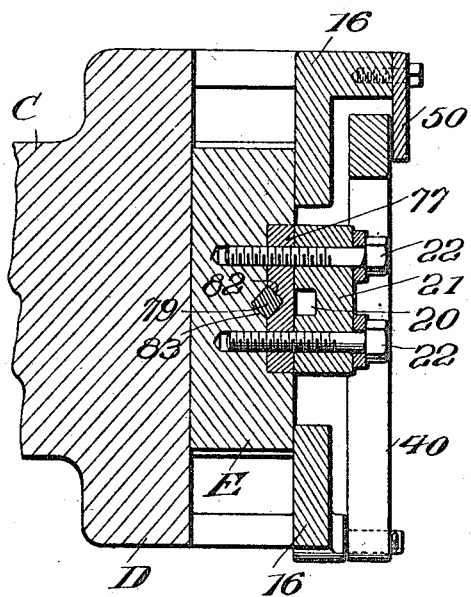

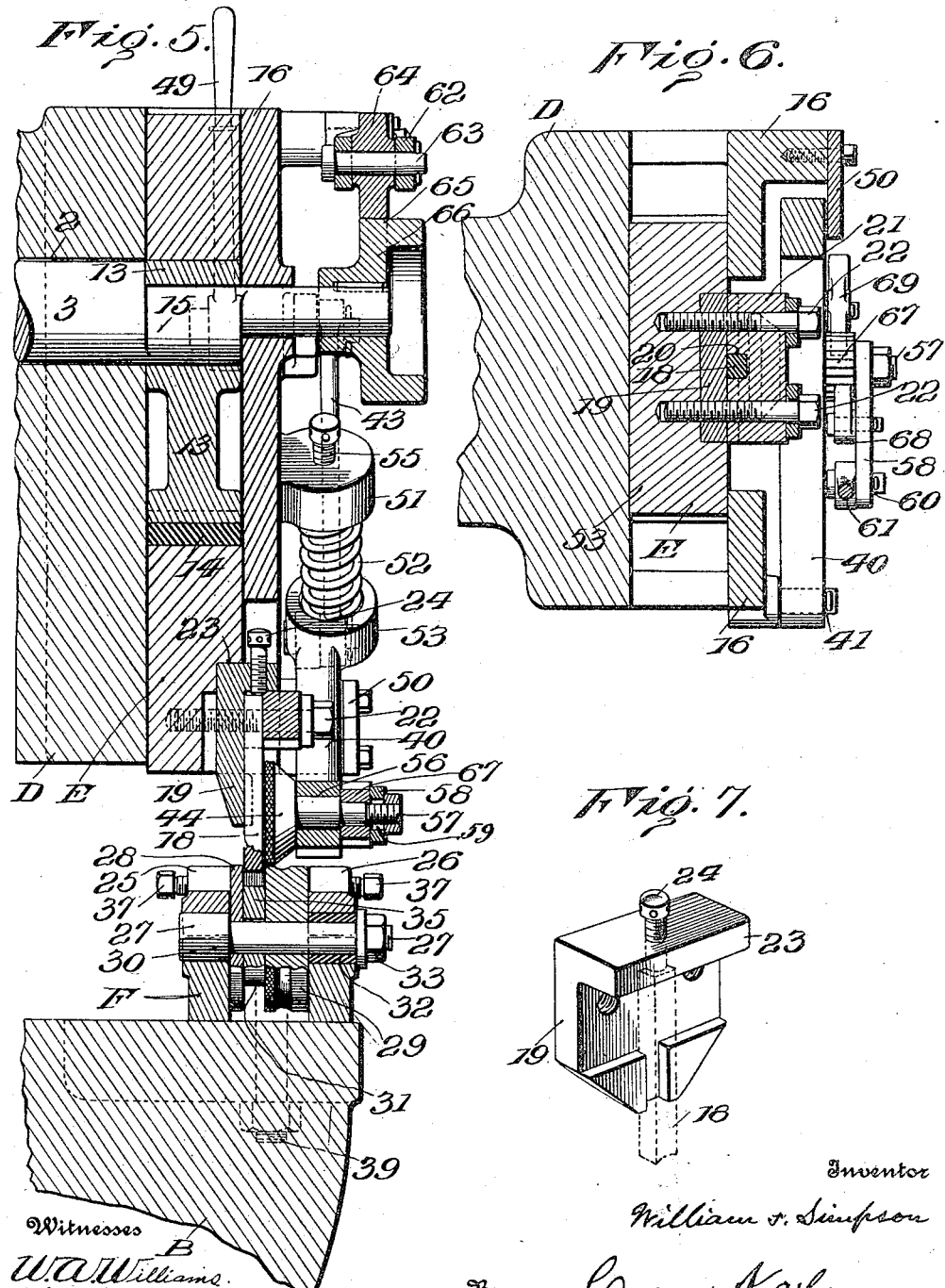

W. F. SIMPSON.
MACHINE FOR CUTTING SHEET FORM MATERIAL.
APPLICATION FILED APR. 7, 1915.
1,208,847.
Patented Dec. 19, 1916.
7 SHEETS—SHEET 6.
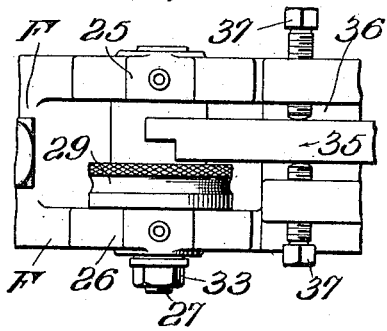
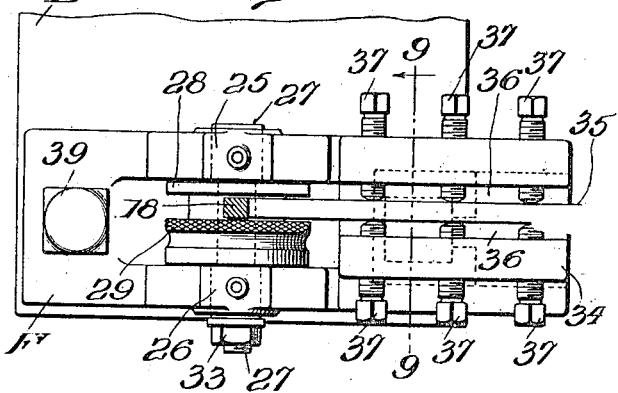
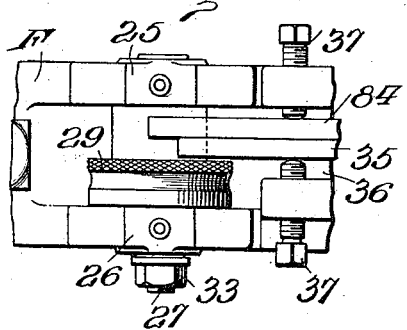
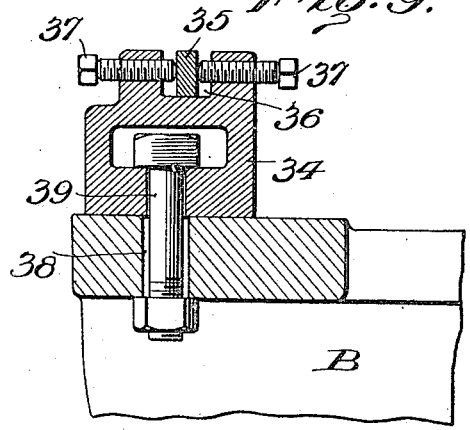
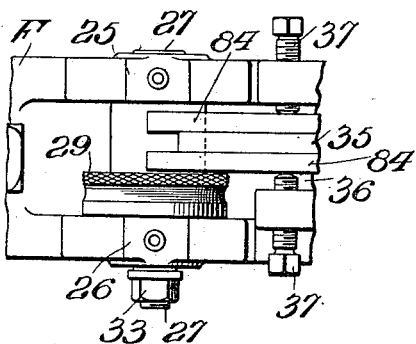
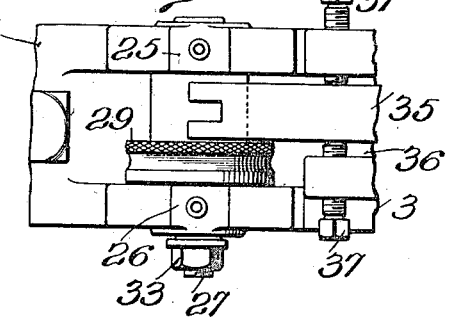
Witnesses
W. A. Williams
L. M. Meyer
Inventor
William F. Simpson
By Cyrus Kehr
Attorney

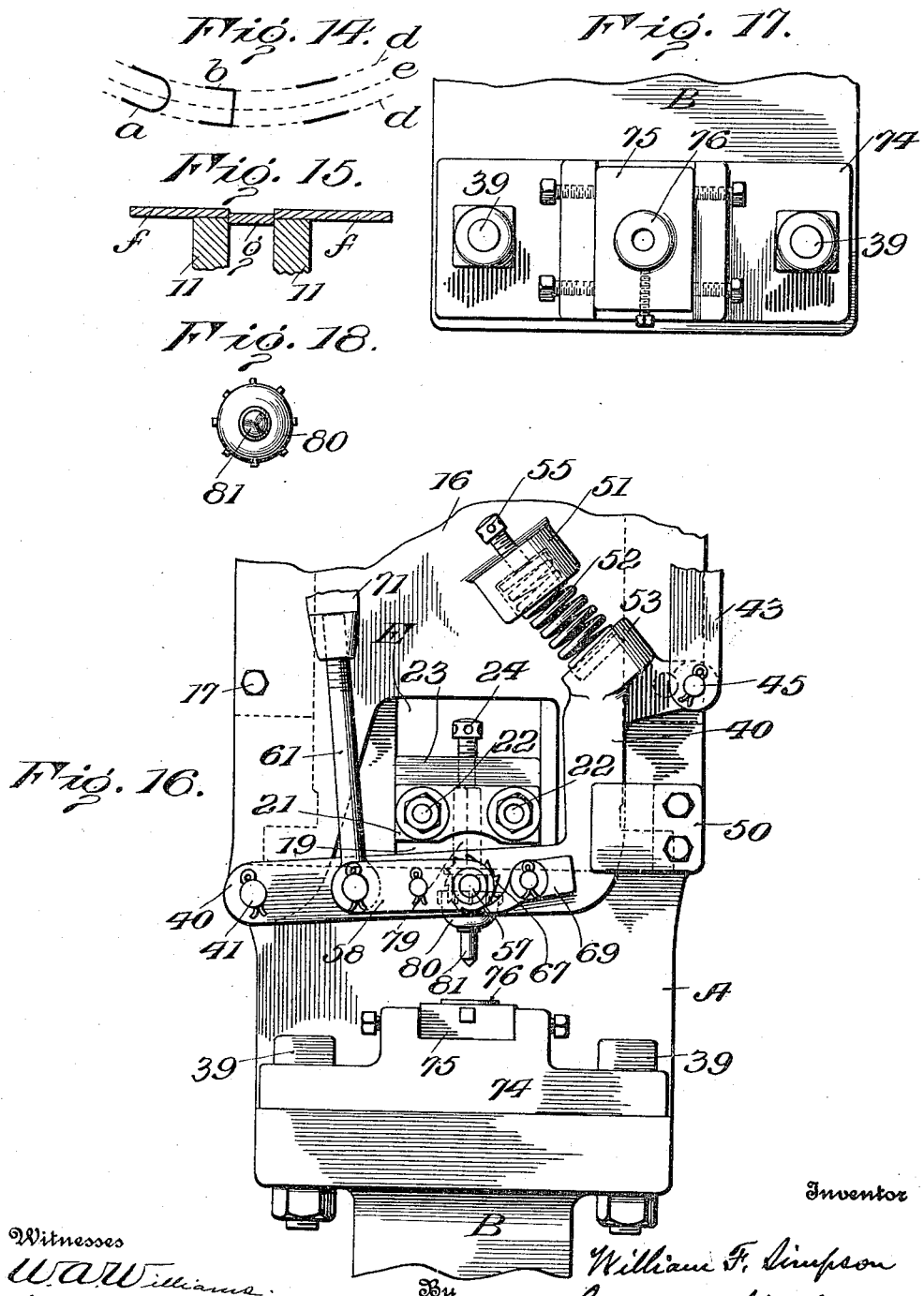

UNITED STATES PATENT OFFICE.

WILLIAM F. SIMPSON, OF KNOXVILLE, TENNESSEE.

MACHINE FOR CUTTING SHEET-FORM MATERIAL.

1,208,847.

Specification of Letters Patent. Patented Dec. 19, 1916.

Application filed April 7, 1915. Serial No. 19,788.

*To all whom it may concern:*

Be it known that I, WILLIAM F. SIMPSON, a citizen of the United States, residing at Knoxville, in the county of Knox and State of Tennessee, have invented a new and useful Improvement in Machines for Cutting Sheet-Form Material, of which the following is a specification, reference being had to the accompanying drawing.

My improvement relates particularly to machines designed for cutting sheet metal by a step-by-step method.

One object of the improvement is to provide a machine for rapidly cutting sheets of metal along lines which are curved or change course so frequently as to prevent the use of shearing machines and to make the use of hand shears difficult.

With respect to this object, my improved machine comprises means for holding and feeding the sheet and means for cutting step-by-step through the sheet, which means coöperate in such manner as to allow the guiding of a sheet through the machine in the same manner as cloth is ordinarily guided through a sewing machine for stitching along any desired course. In the form of the machine shown by the drawings, the feeding and cutting mechanism are closely associated, the feeding members engaging the upper and lower faces of the sheet close to the cutting point, as will hereinafter appear. In the particular form shown by the drawings, said machine comprises as its principal elements a lower stationary cutter, two lower rotary cutting and feeding members, and a reciprocatory cutter working in conjunction with said lower cutters, and an upper feed member.

A further object of the improvement is to provide a machine for cutting along and between lines, as above stated, and also for punching holes through such sheet metal by means of such a punching tool and die as are used in ordinary sheet metal punching machines, the members used for punching and the members used for cutting along and between lines being interchangeable at the will of the operator to a sufficient extent to permit the convenient performing of these two operations alternately, as may be desired.

For analogous machines, reference is here made to United States Patents, No. 1,098,376 and No. 1,098,377, granted to Charles B. Gray, June 2, 1914. The machine of this application differs from the machines of those patents respecting the mounting and driving of the cutting members used for cutting along lines. Furthermore, the machine of this application differs from the machines of said patents in that the latter do not include provision for cutting by means of a punch as well as for cutting along lines.

In the accompanying drawings Figure 1 is a front elevation of a machine embodying my improvement; Fig. 2 is an elevation looking toward the right in Fig. 1; Fig. 3 is the same elevation with the face plate, and parts supported thereby, removed; Fig. 4 is a plan of the machine shown in Fig. 1, the front of the machine being toward the right; Fig. 5 is a section on the line, 5—5, of Fig. 2, looking toward the left, portions being left uncut; Fig. 6 is a section on the line, 6—6, of Fig. 2, looking downward; Fig. 7 is a detail perspective of the bracket plate and reciprocatory cutter; Fig. 8 is a detail plan of the cutter and feeding members, the upper cutter appearing in cross-section; Fig. 9 is an upright section on the line, 9—9, of Fig. 2; Figs. 10, 11, 12 and 13 are detail plans illustrating other forms of the lower cutting members; Figs. 14 and 15 illustrate the cutting operation; Fig. 16 is an elevation showing the punching mechanism in position; Fig. 17 is a plan of the die, die holder, and die block; Fig. 18 is a bottom view of the punch; Fig. 19 is a section on the lower portion of line, 5—5, of Fig. 2, showing a change in the location of the upper cutter; Fig. 20 is a section on the middle portion of line, 6—6, of Fig. 2, showing a change in the location of the upper cutter.

Referring to said drawings, A, is the body of the machine. Said body has a lower arm, B, and an upper arm, C. The space between said arms forms a throat for receiving the sheets of material to be cut, said sheets being moved horizontally into and through said throat. When the mechanism is used for cutting along lines, this movement is automatic after the sheet has been located for cutting. The upper and the lower feeding devices are adapted to be separated from each other to permit manually placing the sheet into the desired position for beginning the cutting operation.

In the form shown in Figs. 1 to 7, inclusive, the sheet feeding and supporting mechanism consists of two rollers bearing against the bottom of the sheet and one roller bearing against the upper face of the sheet, the two lower rollers being mounted on a horizontal rotary shaft and the upper roller being mounted on another horizontal, rotary shaft, both of which shafts are parallel to the upright, longitudinal plane of the machine. These rollers are rotated so as to carry rearward the portions thereof which bear against the sheet, whereby the sheet is carried rearward. In addition to performing their part in supporting and feeding the sheet, the two lower rollers serve as cutters in coöperation with an upper upright, reciprocatory cutter which is actuated by an upper horizontal drive shaft in the same manner as the needle-bar of a sewing machine is ordinarily reciprocated by the needle-bar drive shaft. The upper roller presses upon the sheet and receives rotary motion from said drive shaft. The sheet is thus moved, and through frictional engagement it turns the lower rollers. Said reciprocatory cutter and said lower rollers cut parallel to the movement of the sheet. For transverse cutting between the lines on which the reciprocatory cutter and the two lower rollers make cuts, a stationary cutter is placed between the two lower rollers so as to cut in conjunction with the front edge of the reciprocatory cutter. This, it will be observed involves cutting out a portion of the sheet, such portion having a width according to the space between the two lower rollers. The portion thus cut would be ribbon-form in the absence of the cutting done by the reciprocatory cutter and the stationary cutter. These cutters cut such portion of the sheet transversely, thus forming small chips or fragments.

The body, A, has a right-hand horizontal bearing, 1, and a left hand horizontal bearing, 2, (as viewed in Fig. 1) which receive the drive shaft, 3. At the right of the bearing, 1, a spur gear wheel 4, loosely surrounds the drive shaft, 3. Said wheel receives motion from a small spur gear pinion, 5, mounted on a shaft, 6, which receives power from a source not shown.

Between the bearing, 1, and the spur gear wheel, 4, a clutch, 7, surrounds and rotates with the drive shaft. By engaging said clutch with the spur gear wheel, 4, motion is imparted to the shaft, 3. The clutch is controlled by means of a bell crank, 8, pivoted at, 9, and actuated by means of a pedal lever, 11, pivoted at 12, and coupled to the bell crank by means of a link, 10.

The outer or left hand end of the arm, C, has a transverse, upright head, D, which has an upright channel to receive the slide, E. Said slide has an opening to receive the drive shaft, 3, the cam, 15, the pendulum, 13, and the pendulum block, 14. By means of said shaft, cam, pendulum, and pendulum block, said slide is moved up and down. A face plate, 16, extends across the head, D, to confine the slide, E, for only upright movement. By means of bolts, 17, the face plate is secured immovably to the head, D.

The body, A, the head, D, the face plate, 16, and the slide, E, and the mechanism for reciprocating said slide have been heretofore used in punching machines.

The reciprocatory cutter, 18, is mounted upon and extends downward from the lower portion of the slide, E. For this purpose, a bracket plate, 19, is laid against and into the outer face of the slide and extends below the latter. The outer face of said plate has a groove, 20, to receive said cutter. A clamping plate, 21, extends across the outer face of the bracket plate, 19, and clamping bolts, 22, extend through said clamping plate and the bracket plate, 19, into the slide and bind said plates firmly to the slide. Above the clamping plate, 21, the bracket plate has a forward extension, 23. An upright, set bolt, 24, extends downward through said extension in position to bear against the upper end of the reciprocatory cutter, 18. Said bolt constitutes an adjustable abutment for the upper end of said cutter. When the binding bolts, 22, have been loosened, the set bolt, 24, may be turned to change its elevation so as to permit changing the elevation of the cutter. A convenient way to produce precise adjustment of said cutter is to move both the bolt, 24, and said cutter above the desired position and then turn the bolt for driving the cutter slowly downward until precisely the desired position has been reached. The middle of the lower portion of the face plate is cut away to make room for the reciprocatory cutter and the members used for securing the cutter to the slide.

A lower cutter block, F, is seated on the arm, B, below the slide, E, and has bearings, 25, and 26, which receive the cutter roller shaft, 27. The portion of said shaft which rests in the bearing, 25, is thicker than the portion which extends through the cutting rollers, 28 and 29, and the bearing, 26. The roller, 28, bears against the shoulder, 30, thus formed on the shaft. Said rollers are spaced from each other by means of a spacing ring or washer, 31, which surrounds the shaft between said rollers and is of smaller diameter than the rollers, in order that the reciprocatory cutter and the stationary cutter may extend between said rollers. A sleeve, 32, surrounds the shaft within the bearing, 26. A nut, 33, is threaded to the end of the shaft which projects through the bearing, 26. When said nut is driven toward said bearing, it drives said sleeve, 32, toward the shoulder, 30. Thus said sleeve and rollers and spacing ring are bound between said nut and said shoulder, so that they and the shaft, 27, must turn in unison. Being thus mounted on said block by means of said shaft, said rollers and said shaft are free to turn idly. As above stated, these rollers receive motion from the sheet which is to be cut, movement being imparted to the sheet by the upper roller which will be described farther on.

The stationary cutter, 35, is set horizontally in an arm, 34, located on the block, F, forward of the lower rollers, 28, and 29. Said arm has an upright channel, 36, on the bottom of which said cutter rests, and from each side of the channel, three set bolts, 37, extend horizontally through the bracket into the channel. The ends of said bolts bear against the cutter and bind the latter immovably. The bolts at one side may be retracted and the others driven forward, as may be needed to properly adjust said cutter sidewise to the space between the cutter rollers, 28, and 29. This stationary cutter is extended rearward until its cutting edge is situated above the axis of the shaft, 27, or the highest portion of the rollers, 28, and 29. The rear portion of the cutter is to be set to extend rearward over the spacing washer or ring, 31, as shown in Fig. 5. If the main portion of the cutter extends below the level of the highest portion of said washer, the lower portion of the rear end of the cutter may be cut away to conform to the washer as shown in Fig. 3.

The lower cutter block, F, is secured to the arm, B, of the body, A, by means of bolts, 39, extending through openings, 38, in said arm. Said openings are shown as being larger than the bolts, 39, in order that said blocks may be shifted horizontally for adjustment before the bolts are tightened. In this respect, this block is analogous to the die block of certain punching machines now on the market. This block, F, is so set as to allow the reciprocatory cutter, 18, to extend between the rollers, 28, and 29; and the stationary cutter, 35, is set rearward far enough to barely let the front edge of the reciprocatory cutter pass downward behind the stationary cutter, in order that there may be shearing action between the rear edge of the stationary cutter and the forward edge of the reciprocatory cutter.

The upper roller, 44, is located directly above the lower roller, 29, and said roller is so supported as to permit automatic and also manual up-and-down adjustment of said roller, in order that said roller may adapt itself to varying thicknesses in the sheet to be cut and in order that said roller may be lifted high enough to permit easy manual insertion and removal of the sheet. The chief element concerned in supporting said roller is the roller-supporting bar, 40, hinged at, 41, to the face plate, 16. Its opposite end is coupled at, 45, to the lower end of a link, 43. The upper end of said link is coupled to a short arm, 46, on a shaft, 47, resting in a bearing, 48, supported by the face plate, 16. On the opposite end of said shaft is a hand lever, 49, which is in the upright position when the bar, 40, and the roller, 44, are in the lower position. At the time the short arm, 46, extends rearward, when the lever, 49, is drawn forward and downward, the short arm, 46, moves upward and forward until the line of attachment of the link, 43, to said short arm has crossed a line extending from the axis of the shaft, 47, through the axis of the hinge, 45. Under this condition, said lever and said arm and the upper end of the link, 43, tend to move farther forward in response to downward strain on said link. Hence, when the hand lever, 49, is thrown forward beyond said line, said lever and link and the bar, 40, are automatically held in the position then assumed. A retaining bracket, 50, is applied to the lower forward corner of the face plate and extended across the adjacent portion of the bar, 40, to confine said bar between said bracket and the face of the face plate, in order that lateral movement of the bar, 40, may be prevented.

Above the free end of the arm, 40, the face plate has a spring-receiving socket, 51, which receives one end of an expanding coiled spring, 52. The other end of said spring enters a socket, 53, in the arm, 40. In the socket, 51, is a loose abutment plate, 54, against which the upper end of the spring, 52, bears. A screw bolt, 55 extends downward through said bracket and against said abutment plate. By turning said bolt inward and outward, the position of the abutment plate may be varied, whereby the tension of the spring may be varied. The pressure of said spring is to be sufficient to cause the upper roller, 44, to press downward upon the sheet to be cut with sufficient force for effective control and feed of the sheet.

The bar, 40, has a horizontal, transverse bearing, 56, to receive the shaft, 57, on the right hand end of which the roller, 44, is mounted. The right hand face of said roller rests close to the adjacent face of the reciprocatory cutter, 18, and in the plane of the right hand face of the outer cutting roller, 29, so that when the roller, 44 is pressed downward when there is a sheet between said rollers, said rollers will engage said sheet.

On the outer side of the bar, 40, is a ratchet supporting bar, 58. At its forward end, said bar has a bearing, 59, (Fig. 5) which receives the shaft 57. Said bar extends rearward and is coupled at 60 to the lower end of the approximately upright link 61. The upper end of said link is coupled to the rear end of an approximately horizontal bar 62, the forward end of which bar is hinged at 63 to the face plate 16. Said bar 62 supports a roller 64, which bears upon a cam wheel 65, which is mounted upon the left-hand or outer end of the drive shaft 3. Said cam wheel has one outward extension. Hence the roller 64 and the bar 62 and the link 61 are lifted once during each rotation of the shaft 3.

The wheel 65 has an annular flange 66 extending leftward parallel and concentric to the drive shaft 3. Said flange may be engaged for turning said wheel and said shaft when said members are not being driven by power applied to the spur gear wheel 4.

At the left of the bar, 58, is a ratchet wheel, 67, surrounding and immovably secured to the shaft, 57. The teeth of said ratchet wheel are slanted in the proper direction to cause movement of the lower portion of the roller, 44, rearward when said ratchet wheel is turned by pushing against its teeth. At the rear of said ratchet wheel a pawl, 68, is hinged to the outer or left hand face of the bar, 58, the free end of the pawl resting upon said ratchet wheel by gravity. The various parts are so adjusted and proportioned as to cause the pawl, 68, to move forward far enough to turn the ratchet wheel through at least the length of a tooth when the link, 61, and the bar, 58, are drawn upward by the action of the cam wheel, 65. Forward of the ratchet wheel, a pawl, 69, is pivoted to the bar, 40, by means of a stud, 70. The rear end of said pawl is adapted to swing upward into the path of the ratchet wheel teeth and prevent reverse movement of said wheel. Said pawl is extended forward of the stud, 70, far enough and made of sufficient weight, to normally tilt said pawl to cause the rear end to bear against the ratchet wheel.

The cam wheel, 65, and the cam, 15, are so set upon the shaft, 3, as to cause the link, 61, to be lifted for the actuation of the pawl, 68, while the reciprocatory cutter is above the sheet to be cut.

The range of movement of the pawl, 68, depends upon the distance through which the rear end of the bar, 58, moves up and down. In the form shown in the drawings, the lift of said bar depends upon the length of the link, 61, and the lift of the bar, 62, by the cam, 65. The length of the link, 61, may be varied by means of the turn buckle, 71. In the absence of other means for limiting the downward movement of the bar, 62, such movement is limited by the distance of the dwell of the cam, 65, from the axis of the shaft, 3. For further limiting such downward movement at the will of the operator, I show two brackets, 72, and an upright screw bolt, 73, threaded upward through said brackets and beneath the extended end of the bar, 62. By driving said bolt upward, the downward movement of said bar, 62, may be limited more and more, until said bar is at such height as to altogether avoid engagement between the cam, 65, and the roller, 64, and the reciprocation of the link, 61, and the bar, 58, and the ratchet, 68, cease. By lowering the screw bolt, 73, more and more, the downward movement of the link, 61, the bar, 58, and said ratchet increases more and more until the roller, 64, is loose enough to be engaged by the dwell of the cam, 65. This permits adjustment or variation of the throw of the pawl, 68, to produce the desired extent of rotation of the ratchet wheel and the roller, 44, between strokes of the reciprocatory cutter, 18, to produce feed movement of the sheet through the desired distance. Thus the feed steps may be made very short or of considerable length, according to the requirements of the work.

When the machine is to be used for cutting by means of a punch, the lever, 49, is turned forward and downward to raise and set the feed roller, 44, in its upper position. Then the lower cutter block, F, is detached and the die block, 74, and die holder, 75, and the die, 76, substituted, the bolts, 40, being used for securing the die block, the same as they were used for securing the cutter block, F. This die block, die holder, and die are used in punching machines now on the market. The reciprocatory cutter, 18, is also removed and the punch stock, 79, substituted and secured by means of the clamping plate, 21, and the clamping bolts, 22. On the lower end of the punch stock are a coupling nut, 80, and a punch, 81. The die block, 74, is to be adjusted horizontally to bring the die into position to receive the punch. (See Figs. 16, 17 and 18.) Figs. 19 and 20 of the drawings show another setting of the punch stock and punch. An upright groove, 82, is formed in the right hand face of the bracket plate, 77, and a corresponding groove, 83, is formed in the slide, E, and the punch stock is placed between said plate and the slide in said grooves, and the clamping bolts, 22, then tightened. This form places the punch stock and punch and the punch coupling farther from the upper feed roller, 44. This also facilitates the using of a punch stock of one shape and size and a reciprocatory cutter having a body or stem of another size or shape. In this form, the bracket plate, 77, and the clamping plate, 21, are both used for binding the punch stock. Thus we have in the machine two interchangeable cutting mechanisms, the first of said cutting mechanisms comprising a reciprocatory cutter and serving to make a succession of connecting cuts between and along parallel lines, and the second of said mechanisms serving to punch through a sheet at single chosen places, and we have associated with the first of said cutting mechanisms automatic means for feeding the sheet, said feed mechanism engaging the sheet close to the cutting point and there forming a turning point for turning the sheet manually to change the course of the cutting.

It may also be stated that the machine comprises an upper reciprocatory cutter having a forward, transverse cutting edge and parallel side cutting edges, and comprises lower cutting means presenting cutting edges in opposition to said cutting edges of the upper cutter, and comprises means near the reciprocatory cutter path for turnably holding and feeding the sheet of material to be cut; and, further, the above mentioned cutting mechanism and feeding devices may be removed and the ordinary punching members of a punching machine substituted for operation by locating the sheet manually preparatory to permitting the stroke of the punch.

In Fig. 10, the inner lower roller, 28, has been omitted and the stationary cutter, 35, extended rearward in the space previously occupied by said roller, so that said cutter presents a cutting edge to engage with the inner, lateral cutting edge of the reciprocatory cutter as well as with the forward edge of said cutter. In Fig. 11, said roller, 28, has also been omitted, and a stationary cutter, 84, placed beside the stationary cutter, 35, in the channel, 36, with the rear portion of its right-hand upper edge extending into position to produce shearing action with the left-hand edge of the reciprocatory cutter. In this case, the cutters, 84, and 35, are both secured by the set-bolts, 37. In Fig. 12, said roller, 28, has also been omitted, and a stationary cutter, 84, placed at each side of the stationary cutter, 35, in the channel, 36, the rear portion of each upper edge of each cutter, 84, which is adjacent the cutter, 35, extending into position to produce shearing action with the adjacent side edge of the reciprocatory cutter. The two cutters, 84, and the cutter, 35, are secured by the set bolts, 37. In this case, the remaining lower roller (29) does not act as a cutting roller. It acts merely as a supporting and feeding roller.

In Fig. 13, the rear portion of the stationary cutter, 35, has two cutting edges parallel to the length of the cutter and a straight cutting edge transverse to and connecting with said parallel edges. When this form is used, the forward portion of the reciprocatory cutter is correspondingly formed with two side edges and a forward, transverse edge.

In my machine, the cutting along a path is not a single straight cut. It extends into two lines which are parallel to each other and to the course of the feed, and the portion of the sheet between said two lines is depressed out of the sheet plane; thus leaving the metal at each side of the space between said two lines in the sheet plane and presenting substantially continuous edges. (See Figs. 14 and 15.) When the cutting is carried across the space between said two lines, the portion between said lines is cut transversely into relatively small pieces, the size of each piece being determined by the distance between said lines and by the distance of feed of the sheet between strokes of the reciprocatory cutter. If the cut does not extend across the space between said two lines, the portion of the sheet between said lines will form a ribbon which is depressed out of the sheet line as fast as the cutting proceeds. In either form, there are two parallel lines along which cuts are made and between which the metal is pressed downward by the reciprocatory cutter. The transverse portion of the cut may be eliminated by moving the lower cutter rearward (toward the right as viewed in Figs. 6, 8, 9, and 10), so that there is no engagement between the upper cutter and the transverse portion of the cutting edge of the lower cutter. When this is done the ribbon or tongue formed is to be bent downward fast enough to permit the turning of the sheet. The reciprocatory cutter may be so shaped as to bear down upon the tongue or ribbon in such manner as to bend it downward. If the cut extends transversely from one of said lines to the other, it is immaterial whether the transverse portion of the cut is straight, curved or otherwise.

In Fig. 14, the dotted line, e, shows the course of feed of the sheet. Such course may be straight or curved. The lines, d, d, indicate the above-mentioned parallel lines along which cuts are made and between which the metal is removed. Such a cut as is made by the cutter shown by Fig. 6 is indicated by a; and the cut made by the cutters of Figs. 8, 9, and 10 is indicated by b; while c indicates the cut made when the portion of the cut which is transverse to the course of feed is omitted.

Fig. 15 shows a section taken transversely on a or b or c, the sheet being indicated by f and the portion of the sheet which is cut away being indicated by g.

I claim as my invention,

1. In a machine of the nature described, the combination of a body having arms between which there is a throat, a drive member on the upper arm, a pair of feed members standing below said drive member in opposition to each other at said throat and adapted to receive a sheet between them and normally constantly press said sheet, a reciprocatory cutter adjacent said feed members and in operative relation with said drive member, and means on the upper arm and above the sheet plane operatively connecting the upper feed member with said drive member for actuating said feed member, substantially as described.

2. In a machine of the nature described, the combination of a body having arms between which there is a throat, a drive member on the upper arm, a pair of feed rollers standing below said drive member in opposition to each other at said throat and adapted to receive a sheet between them and normally constantly press said sheet, a reciprocatory cutter adjacent said feed rollers and in operative relation with said drive member, and means on the upper arm and above the sheet plane operatively connecting the upper feed roller with said drive member for turning said roller, substantially as described.

3. In a machine of the nature described, the combination of a body having arms between which there is a throat, a face plate on the upper arm, a drive member on the upper arm, a pair of feed members standing in opposition to each other at said throat and adapted to receive a sheet between them, a reciprocatory cutter adjacent said feed members and in operative relation with said drive member, and means on said face plate operatively connecting the upper feed member with said drive member for actuating said member for feeding, substantially as described.

4. In a machine of the nature described, the combination of a body having arms between which there is a throat, a face plate on the upper arm, a drive member on the upper arm, a pair of feed rollers standing in opposition to each other at said throat and adapted to receive a feed member between them, a reciprocatory cutter adjacent said feed rollers and in operative relation with said feed member, and means on said face plate connecting the upper feed roller with said feed member for turning said roller, substantially as described.

5. In a machine of the nature described, the combination of a body having arms between which there is a throat, a drive member on the upper arm, a pair of feed members standing in opposition to each other at said throat and adapted to receive a sheet between them and normally constantly press said sheet, a liftable support for the upper feed member, said support being supported on the upper arm, means controlled by the operator for lifting said support, a reciprocatory cutter adjacent said feed members and in operative relation with said drive member, and means on the upper arm operatively connecting the upper feed member with said drive member for actuating said feed member, substantially as described.

6. In a machine of the nature described, the combination of a body having arms between which there is a throat, a drive member on the upper arm, a pair of feed rollers standing in opposition to each other at said throat and adapted to receive a sheet between them, a liftable support for the upper feed roller, said support being supported on the upper arm, and means controlled by the operator for lifting said support, a reciprocatory cutter adjacent said feed members and in operative relation with said drive member, and means on the upper arm operatively connecting the upper feed roller with said drive member for turning said roller, substantially as described.

7. In a machine of the nature described, the combination of a body having arms between which there is a throat, a face plate on the upper arm, a drive member on the upper arm, a pair of feed members standing in opposition to each other at said throat and adapted to receive a sheet between them and normally constantly press said sheet, a liftable support for the upper feed member, said support being supported on said face plate, and means controlled by the operator for lifting said support and securing it in the lifted position, a reciprocatory cutter adjacent said feed members and in operative relation with said drive member, and means on the upper arm operatively connecting the upper feed roller with said drive member for turning said roller, substantially as described.

8. In a machine of the nature described, the combination of a body having arms between which there is a throat, a face plate on the upper arm, a drive member on the upper arm, a pair of feed rollers standing in opposition to each other at said throat and adapted to receive a sheet between them, a liftable support for the upper roller, said support being supported by the face plate, means controlled by the operator for lifting said support, a reciprocatory cutter adjacent said feed rollers and in operative relation with said drive member, and means on said face plate connecting the upper feed roller with said drive member for turning said roller, substantially as described.

9. In a machine of the nature described, the combination of a body having arms between which there is a throat, a drive member on the upper arm, a pair of feed members standing in opposition to each other at said throat and adapted to receive a sheet between them and normally constantly press said sheet, a liftable support for the upper feed member, said support being supported on the upper arm, means controlled by the operator for lifting said support and securing it in the lifted position, a reciprocatory cutter adjacent said feed members and in operative relation with said drive member, and means on the upper arm operatively connecting the upper feed member with said drive member for actuating said feed member, substantially as described.

10. In a machine of the nature described, the combination of a body having arms between which there is a throat, a drive member on the upper arm, a pair of feed rollers standing in opposition to each other at said throat and adapted to receive a sheet between them, a liftable support for the upper feed roller, said support being supported on the upper arm, and means controlled by the operator for lifting said support and securing it in the lifted position, a reciprocatory cutter adjacent said feed members and in operative relation with said drive member, and means on the upper arm operatively connecting the upper feed roller with said drive member for turning said roller, substantially as described.

11. In a machine of the nature described, the combination of a body having arms between which there is a throat, a face plate on the upper arm, a drive member on the upper arm, a pair of feed members standing in opposition to each other at said throat and adapted to receive a sheet between them and normally constantly press said sheet, a liftable support for the upper feed member, said support being supported on said face plate, and means controlled by the operator for lifting said support and securing it in the lifted position, a reciprocatory cutter adjacent said feed members and in operative relation with said drive member, and means on the upper arm operatively connecting the upper feed roller with said drive member, for turning said roller, substantially as described.

12. In a machine of the nature described, the combination of a body having arms between which there is a throat, a face plate on the upper arm, a drive member on the upper arm, a pair of feed rollers standing in opposition to each other at said throat and adapted to receive a sheet between them, a liftable support for the upper roller, said support being supported by the face plate, means controlled by the operator for lifting said support and securing it in the lifted position, a reciprocatory cutter adjacent said feed rollers and in operative relation with said drive member, and means on said face plate connecting the upper feed roller with said drive member for turning said roller, substantially as described.

13. In a machine of the nature described, the combination of a body having arms between which there is a throat, a face plate on the upper arm, a drive member on the upper arm, a pair of feed members standing in opposition to each other at said throat and adapted to receive a sheet between them, a liftable support for the upper feed member, said support being supported on the face plate, means controlled by the operator for lifting said support, a reciprocatory cutter adjacent said feed members and in operative relation with said drive member, and means on the upper arm operatively connecting the upper feed member with said drive member for actuating said feed member, substantially as described.

14. In a machine of the nature described, the combination of a body having arms between which there is a throat, a face plate on the upper arm, a drive member on the upper arm, a pair of feed rollers standing in opposition to each other at said throat and adapted to receive a sheet between them, a liftable support for the upper feed roller, said support being supported on the face plate, and means controlled by the operator for lifting said support, a reciprocatory cutter adjacent said feed members and in operative relation with said drive member, and means on the upper arm operatively connecting the upper feed roller with said drive member for turning said roller, substantially as described.

15. In a machine of the nature described, the combination of a body having arms between which there is a throat, a face plate on the upper arm, a drive member on the upper arm, a pair of feed rollers standing in opposition to each other at said throat and adapted to receive a sheet between them, a liftable support for the upper roller, said support being supported by the face plate, means controlled by the operator for lifting said support and securing it in the lifted position, a reciprocatory cutter adjacent said feed rollers and in operative relation with said drive member, and means on said face plate connecting the upper feed roller with said drive member for turning said roller, substantially as described.

16. In a machine of the nature described, the combination of a body having arms between which there is a throat, a drive member on the upper arm, a pair of feed members standing in opposition to each other at the outer side of the reciprocatory cutter path and adapted to receive a sheet between them and normally constantly press said sheet, a reciprocatory cutter adjacent said feed members and in operative relation with said drive member, and means on the upper arm operatively connecting the upper feed member with said drive member for actuating said feed member, substantially as described.

17. In a machine of the nature described, the combination of a body having arms between which there is a throat, a drive member on the upper arm, a pair of feed rollers standing in opposition to each other at the outer side of the reciprocatory cutter path and adapted to receive a sheet between them, a reciprocatory cutter adjacent said feed rollers and in operative relation with said drive member, and means on the upper arm operatively connecting the upper feed roller with said drive member for turning said roller, substantially as described.

18. In a machine of the nature described, the combination of a body having arms between which there is a throat, a face plate on the upper arm, a drive member on the upper arm, a pair of feed members standing in opposition to each other at the outer side of the reciprocatory cutter path and adapted to receive a sheet between them and normally constantly press said sheet, a reciprocatory cutter adjacent said feed members and in operative relation with said drive member, and means on said face plate operatively connecting the upper feed member with said drive member for actuating said member for feeding, substantially as described.

19. In a machine of the nature described, the combination of a body having arms between which there is a throat, a face plate on the upper arm, a drive member on the upper arm, a pair of feed rollers standing in opposition to each other at the outer side of the reciprocatory cutter path and adapted to receive a feed member between them, a reciprocatory cutter adjacent said feed rollers and in operative relation with said drive member, and means on said face plate connecting the upper feed roller with said drive member for turning said roller, substantially as described.

20. In a machine of the nature described, the combination of a body having arms between which there is a throat, a drive member on the upper arm, a pair of feed members standing in opposition to each other at the outer side of the reciprocatory cutter path and adapted to receive a sheet between them and normally constantly press said sheet, a liftable support for the upper feed member, said support being supported on the upper arm, means controlled by the operator for lifting said support, a reciprocatory cutter adjacent said feed members and in operative relation with said drive member, and means on the upper arm operatively connecting the upper feed member with said drive member for actuating said feed member, substantially as described.

21. In a machine of the nature described, the combination of a body having arms between which there is a throat, a drive member on the upper arm, a pair of feed rollers standing in opposition to each other at the outer side of the reciprocatory cutter path and adapted to receive a sheet between them, a liftable support for the upper feed roller, said support being supported on the upper arm, and means controlled by the operator for lifting said support, a reciprocatory cutter adjacent said feed members and in operative relation with said drive member, and means on the upper arm operatively connecting the upper feed roller with said drive member for turning said roller, substantially as described.

22. In a machine of the nature described, the combination of a body having arms between which there is a throat, a face plate on the upper arm, a drive member on the upper arm, a pair of feed members standing in opposition to each other at the outer side of the reciprocatory cutter path and adapted to receive a sheet between them and normally constantly press said sheet, a liftable support for the upper feed member, said support being supported on said face plate, and means controlled by the operator for lifting said support and securing it in the lifted position, a reciprocatory cutter adjacent said feed members and in operative relation with said drive member, and means on the upper arm operatively connecting the upper feed roller with said drive member for turning said roller, substantially as described.

23. In a machine of the nature described, the combination of a body having arms between which there is a throat, a face plate on the upper arm, a drive member on the upper arm, a pair of feed rollers standing in opposition to each other at the outer side of the reciprocatory cutter path and adapted to receive a sheet between them, a liftable support for the upper roller, said support being supported by the face plate, means controlled by the operator for lifting said support, a reciprocatory cutter adjacent said feed rollers and in operative relation with said drive member, and means on said face plate connecting the upper feed roller with said drive member for turning said roller, substantially as described.

24. In a machine of the nature described, the combination of a body having arms between which there is a throat, a drive member on the upper arm, a pair of feed members standing in opposition to each other at the outer side of the reciprocatory cutter path and adapted to receive a sheet between them and normally constantly press said sheet, a liftable support for the upper feed member, said support being supported on the upper arm, means controlled by the operator for lifting said support and securing it in the lifted position, a reciprocatory cutter adjacent said feed members and in operative relation with said drive member, and means on the upper arm operatively connecting the upper feed member with said member for actuating said feed member, substantially as described.

25. In a machine of the nature described, the combination of a body having arms between which there is a throat, a drive member on the upper arm, a pair of feed rollers standing in opposition to each other at the outer side of the reciprocatory cutter path and adapted to receive a sheet between them, a liftable support for the upper feed roller, said support being supported on the upper arm, means controlled by the operator for lifting said support and securing it in the lifted position, a reciprocatory cutter adjacent said feed members and in operative relation with said drive member, and means on the upper arm, operatively connecting the upper feed roller with said drive member for turning said roller, substantially as described.

26. In a machine of the nature described, the combination of a body having arms between which there is a throat, a face plate on the upper arm, a drive member on the upper arm, a pair of feed members standing in opposition to each other at the outer side of the reciprocatory cutter path and adapted to receive a sheet between them, a liftable support for the upper feed member, said support being supported on said face plate, and means controlled by the operator for lifting said support and securing it in the lifted position, a reciprocatory cutter adjacent said feed members and in operative relation with said drive member, and means on the upper arm operatively connecting the upper feed roller with said drive member for turning said roller, substantially as described.

27. In a machine of the nature described, the combination of a body having arms between which there is a throat, a face plate on the upper arm, a drive member on the upper arm, a pair of feed rollers standing in opposition to each other at the outer side of the reciprocatory cutter path and adapted to receive a sheet between them, a liftable support for the upper roller, said support being supported by the face plate, means controlled by the operator for lifting said support and securing it in the lifted position, a reciprocatory cutter adjacent said feed rollers and in operative relation with said drive member, and means on said face plate connecting the upper feed roller with said drive member for turning said roller, substantially as described.

28. In a machine of the nature described, the combination of a body having arms between which there is a throat, a face plate on the upper arm, a drive member on the upper arm, a pair of feed members standing in opposition to each other at the outer side of the reciprocatory cutter path and adapted to receive a sheet between them, a liftable support for the upper feed member, said support being supported on the face plate, means controlled by the operator for lifting said support, a reciprocatory cutter adjacent said feed members and in operative relation with said drive member, and means on the upper arm operatively connecting the upper feed member with said drive member for actuating said feed member, substantially as described.

29. In a machine of the nature described, the combination of a body having arms between which there is a throat, a face plate on the upper arm, a drive member on the upper arm, a pair of feed rollers standing in opposition to each other at the outer side of the reciprocatory cutter path and adapted to receive a sheet between them, a liftable support for the upper feed roller, said support being supported on the face plate, and means controlled by the operator for lifting said support, a reciprocatory cutter adjacent said feed members and in operative relation with said drive member, and means on the upper arm operatively connecting the upper feed roller with said drive member for turning said roller, substantially as described.

30. In a machine of the nature described, the combination of a body having arms between which there is a throat, a face plate on the upper arm, a drive member on the upper arm, a pair of feed rollers standing in opposition to each other at the outer side of the reciprocatory cutter path and adapted to receive a sheet between them, a liftable support for the upper roller, said support being supported by the face plate, means controlled by the operator for lifting said support and securing it in the lifted position, a reciprocatory cutter adjacent said feed rollers and in operative relation with said drive member, and means on said face plate connecting the upper feed roller with said drive member for turning said roller, substantially as described.

31. In a machine of the nature described, the combination of a body having arms between which there is a throat, a drive member on the upper arm, a pair of feed members standing in opposition to each other at said throat and adapted to receive a sheet between them, a reciprocatory cutter adjacent said feed members and in operative relation with said drive member, and adjustable means on the upper arm for actuating the upper feed member, substantially as described.

32. In a machine of the nature described, the combination of a body having arms between which there is a throat, a drive member on the upper arm, a pair of feed rollers standing in opposition to each other at said throat and adapted to receive a sheet between them, a reciprocatory cutter adjacent said feed members and in operative relation with said drive member, and adjustable means on the upper arm for turning the upper roller, substantially as described.

33. In a machine of the nature described, the combination of a body having arms between which there is a throat, a face plate on the upper arm, a drive member on the upper arm, a pair of feed members standing in oppositton to each other at said throat and adapted to receive a sheet between them, a reciprocatory cutter adjacent said feed members and in operative relation with said drive member, and adjustable means on said face plate for actuating the upper feed member for feeding, substantially as described.

34. In a machine of the nature described, the combination of a body having arms between which there is a throat, a face plate on the upper arm, a drive member on the upper arm, a pair of feed rollers standing in opposition to each other at said throat and adapted to receive a feed member between them, a reciprocatory cutter adjacent said feed rollers and in operative relation with said drive member, and adjustable means on said face plate for turning said roller, substantially as described.

35. In a machine of the nature described, the combination of a body having arms between which there is a throat, a drive member on the upper arm, a pair of feed members standing in opposition to each other at said throat and adapted to receive a sheet between them, a reciprocatory cutter adjacent said feed members and in operative relation with said drive member, and adjustable means on the upper arm operatively connecting the upper feed member with said drive member for actuating said feed member, substantially as described.

36. In a machine of the nature described, the combination of a body having arms between which there is a throat, a drive member on the upper arm, a pair of feed rollers standing in opposition to each other at said throat and adapted to receive a sheet between them, a reciprocatory cutter adjacent said feed members and in operative relation with said drive member, and adjustable means on the upper arm operatively connecting the upper feed roller with said drive member for turning said roller, substantially as described.

37. In a machine of the nature described, the combination of a body having arms between which there is a throat, a face plate on the upper arm, a drive member on the upper arm, a pair of feed members standing in opposition to each other at said throat and adapted to receive a sheet between them, a reciprocatory cutter adjacent said feed members and in operative relation with said drive member, and adjustable means on said face plate operatively connecting the upper feed member with said drive member, for actuating said member for feeding, substantially as described.

38. In a machine of the nature described, the combination of a body having arms between which there is a throat, a face plate on the upper arm, a drive member on the upper arm, a pair of feed rollers standing in opposition to each other at said throat and adapted to receive a sheet between them, a reciprocatory cutter adjacent said feed rollers and in operative relation with said drive member, and adjustable means on said face plate connecting the upper feed roller with said drive member for turning said roller, substantially as described.

39. In a machine of the nature described, the combination of a body having arms between which there is a throat, a drive member on the upper arm, a pair of feed members standing in opposition to each other at said throat and adapted to receive a sheet between them, a liftable support for the upper feed member, said support being supported on the upper arm, means controlled by the operator for lifting said support, a reciprocatory cutter adjacent said feed members and in operative relation with said drive member, and adjustable means on the upper arm operatively connecting the upper feed member with said drive member for actuating said feed member, substantially as described.

40. In a machine of the nature described, the combination of a body having arms between which there is a throat, a drive member on the upper arm, a pair of feed rollers standing in opposition to each other at said throat and adapted to receive a sheet between them, a liftable support for the upper feed roller, said support being supported on the upper arm, and means controlled by the operator for lifting said support, a reciprocatory cutter adjacent said feed members and in operative relation with said drive member, and means on the upper arm operatively connecting the upper feed roller with said drive member for turning said roller, substantially as described.

41. In a machine of the nature described, the combination of a body having arms between which there is a throat, a face plate on the upper arm, a drive member on the upper arm, a pair of feed members standing in opposition to each other at said throat and adapted to receive a sheet between them, a liftable support for the upper feed member, said support being supported on said face plate, and adjustable means controlled by the operator for lifting said support and securing it in the lifted position, a reciprocatory cutter adjacent said feed members and in operative relation with said drive member, and means on the upper arm operatively connecting the upper feed roller with said drive member for turning said roller, substantially as described.

42. In a machine of the nature described, the combination of a body having arms between which there is a throat, a face plate on the upper arm, a drive member on the upper arm, a pair of feed rollers standing in opposition to each other at said throat and adapted to receive a sheet between them, a liftable support for the upper roller, said support being supported by the face plate, means controlled by the operator for lifting said support, a reciprocatory cutter adjacent said feed rollers and in operative relation with said drive member, and adjustable means on said face plate connecting the upper feed roller with said drive member for turning said roller, substantially as described.

43. In a machine of the nature described, the combination of a body having arms between which there is a throat, a drive member on the upper arm, a pair of feed members standing in opposition to each other at the outer side of the path of the reciprocatory cutter and adapted to receive a sheet between them and normally constantly press said sheet, a reciprocatory cutter adjacent said feed members and in operative relation with said drive member, and means on the upper arm for actuating the upper feed member, substantially as described.

44. In a machine of the nature described, the combination of a body having arms between which there is a throat, a drive member on the upper arm, a pair of feed rollers standing in opposition to each other at the outer side of the reciprocatory cutter path and adapted to receive a sheet between them, a reciprocatory cutter adjacent said feed rollers and in operative relation with said drive member, and means on the upper arm for turning the upper roller, substantially as described.

45. In a machine of the nature described, the combination of a body having arms between which there is a throat, a face plate on the upper arm, a drive member on the upper arm, a pair of feed members standing in opposition to each other at the outer side of the reciprocatory cutter path and adapted to receive a sheet between them and normally constantly press said sheet, a reciprocatory cutter adjacent said feed members and in operative relation with said drive member, and means on said face plate for actuating the upper member for feeding, substantially as described.

46. In a machine of the nature described, the combination of a body having arms between which there is a throat, a face plate on the upper arm, a drive member on the upper arm, a pair of feed rollers standing in opposition to each other at the outer side of the reciprocatory cutter path and adapted to receive a feed member between them, a reciprocatory cutter adjacent said feed rollers and in operative relation with said drive member and means on said face plate for turning said roller, substantially as described.

47. In a machine of the nature described, the combination of a body having arms between which there is a throat, a drive member on the upper arm, a pair of feed members standing in opposition to each other at the outer side of the path of the reciprocatory cutter and adapted to receive a sheet between them, a reciprocatory cutter adjacent said feed members and in operative relation with said drive member, and adjustable means on the upper arm for actuating the upper feed member, substantially as described.

48. In a machine of the nature described, the combination of a body having arms between which there is a throat, a drive member on the upper arm, a pair of feed rollers standing in opposition to each other at the outer side of the reciprocatory cutter path and adapted to receive a sheet between them, a reciprocatory cutter adjacent said feed members and in operative relation with said drive member, and adjustable means on the upper arm for turning the upper roller, substantially as described.

49. In a machine of the nature described, the combination of a body having arms between which there is a throat, a face plate on the upper arm, a drive member on the upper arm, a pair of feed members standing in opposition to each other at the outer side of the reciprocatory cutter path and adapted to receive a sheet between them and normally constantly press said sheet, a reciprocatory cutter adjacent said feed members and in operative relation with said drive member, and adjustable means on said face plate for actuating the upper member for feeding, substantially as described.

50. In a machine of the nature described, the combination of a body having arms between which there is a throat, a face plate on the upper arm, a drive member on the upper arm, a pair of feed rollers standing in opposition to each other at the outer side of the reciprocatory cutter path and adapted to receive a feed member between them, a reciprocatory cutter adjacent said feed rollers and in operative relation with said member, and adjustable means on said face plate for turning said roller, substantially as described.

51. In a machine of the nature described, the combination of a body having arms between which there is a throat, a drive member on the upper arm, a pair of feed members standing below said drive member in opposition to each other at the outer side of the path of the reciprocatory cutter and adapted to receive a sheet between them, a reciprocatory cutter adjacent said feed members and in operative relation with said drive member, and ratchet mechanism on the upper arm and above the sheet plane for actuating the upper feed member, substantially as described.

52. In a machine of the nature described, the combination of a body having arms between which there is a throat, a face plate on the upper arm, a drive member on the upper arm, a pair of feed members standing in opposition to each other at the outer side of the reciprocatory cutter path and adapted to receive a sheet between them, a reciprocatory cutter adjacent said feed members and in operative relation with said drive member, and ratchet mechanism on said face plate for actuating the upper member for feeding, substantially as described.

53. In a machine of the nature described, the combination of a body having arms between which there is a throat, a face plate on the upper arm, a drive member on the upper arm, a pair of feed rollers standing in opposition to each other at the outer side of the reciprocatory cutter path and adapted to receive a feed member between them, a reciprocatory cutter adjacent said feed rollers in operative relation with said drive member, and ratchet mechanism on said face plate for turning said roller, substantially as described.

54. In a machine of the nature described, the combination of a body having arms between which there is a throat, a drive member on the upper arm, a pair of feed members standing in opposition to each other at the outer side of the path of the reciprocatory cutter and adapted to receive a sheet between them, a reciprocatory cutter adjacent said feed members and in operative relation with said drive member, and adjustable ratchet mechanism on the upper arm for actuating the upper feed member, substantially as described.

55. In a machine of the nature described, the combination of a body having arms between which there is a throat, a drive member on the upper arm, a pair of feed rollers standing in opposition to each other at the outer side of the reciprocatory cutter path and adapted to receive a sheet between them, a reciprocatory cutter adjacent said feed members and in operative relation with said drive member, and adjustable ratchet mechanism on the upper arm for turning the upper roller, substantially as described.

56. In a machine of the nature described, the combination of a body having arms between which there is a throat, a face plate on the upper arm, a drive member on the upper arm, a pair of feed members standing in opposition to each other at the outer side of the reciprocatory cutter path and adapted to receive a sheet between them, a reciprocatory cutter adjacent said feed members and in operative relation with said drive member, and adjustable ratchet mechanism on said face plate for actuating the upper member for feeding, substantially as described.

57. In a machine of the nature described, the combination of a body having arms between which there is a throat, a face plate on the upper arm, a drive member on the upper arm, a pair of feed rollers standing in opposition to each other at the outer side of the reciprocatory cutter path and adapted to receive a feed member between them, a reciprocatory cutter adjacent said feed rollers and in operative relation with said drive member, and adjustable ratchet mechanism on said face plate for turning said roller, substantially as described.

58. In a machine of the nature described, the combination of a body having arms between which there is a throat, a drive member on the upper arm, a pair of feed members standing in opposition to each other at said throat and adapted to receive a sheet between them and normally constantly press said sheet, a reciprocatory cutter adjacent said feed members and in operative relation with said drive member, means on the upper arm operatively connecting the upper feed member with said drive member for actuating said feed member, and a stationary cutter near the lower feed member, substantially as described.

59. In a machine of the nature described, the combination of a body having arms between which there is a throat, a drive member on the upper arm, a pair of feed rollers standing in opposition to each other at said throat and adapted to receive a sheet between them and normally constantly press said sheet, a reciprocatory cutter adjacent said feed members and in operative relation with said drive member, means on the upper arm operatively connecting the upper feed roller with said drive member for turning said roller, and a stationary cutter near the lower feed roller, substantially as described.

60. In a machine of the nature described, the combination of a body having arms between which there is a throat, a face plate on the upper arm, a drive member on the upper arm, a pair of feed members standing in opposition to each other at said throat and adapted to receive a sheet between them, a reciprocatory cutter adjacent said feed members and in operative relation with said drive member, means on said face plate operatively connecting the upper feed member with said drive member for actuating said member for feeding, and a stationary cutter near the lower feed member, substantially as described.

61. In a machine of the nature described, the combination of a body having arms between which there is a throat, a face plate on the upper arm, a drive member on the upper arm, a pair of feed rollers standing in opposition to each other at said throat and adapted to receive a feed member between them, a reciprocatory cutter adjacent said feed rollers and in operative relation with said drive member, means on said plate connecting the upper feed roller with said drive member for turning said roller, and a stationary cutter near the lower feed roller, substantially as described.

62. In a machine of the nature described, the combination of a body having arms between which there is a throat, a drive member on the upper arm, a pair of feed members standing in opposition to each other at said throat and adapted to receive a sheet between them and normally constantly press said sheet, a liftable support for the upper feed member, said support being supported on the upper arm, means controlled by the operator for lifting said support, a reciprocatory cutter adjacent said feed members and in operative relation with said drive member, means on the upper arm operatively connecting the upper feed member with said drive member for actuating said feed member, and a stationary cutter near the lower feed member, substantially as described.

63. In a machine of the nature described, the combination of a body having arms between which there is a throat, a drive member on the upper arm, a pair of feed rollers standing in opposition to each other at said throat and adapted to receive a sheet between them, a liftable support for the upper feed roller, said support being supported on the upper arm, and means controlled by the operator for lifting said support, a reciprocatory cutter adjacent said feed members and in operative relation with said drive member, means on the upper arm operatively connecting the upper feed roller with said drive member for turning said roller, and a stationary cutter near the lower feed roller, substantially as described.

64. In a machine of the nature described, the combination of a body having arms between which there is a throat, a face plate on the upper arm, a drive member on the upper arm, a pair of feed members standing in opposition to each other at said throat and adapted to receive a sheet between them and normally constantly press said sheet, a liftable support for the upper feed member, said support being supported on said face plate, and means controlled by the operator for lifting said support and securing it in the lifted position, a reciprocatory cutter adjacent said feed members and in operative relation with said drive member, means on the upper arm operatively connecting the upper feed roller with said drive member for turning said roller, and a stationary cutter near the lower feed roller, substantially as described.

65. In a machine of the nature described, the combination of a body having arms between which there is a throat, a face plate on the upper arm, a drive member on the upper arm, a pair of feed rollers standing in opposition to each other, at said throat and adapted to receive a sheet between them, a liftable support for the upper roller, said support being supported by the face plate, means controlled by the operator for lifting said support, a reciprocatory cutter adjacent said feed rollers and in operative relation with said drive member, means on said face plate connecting the upper feed roller with said drive member for turning said roller, and a stationary cutter near the lower feed roller, substantially as described.

66. In a machine of the nature described, the combination of a body having arms between which there is a throat, a drive member on the upper arm, a pair of feed members standing in opposition to each other at said throat and adapted to receive a sheet between them and normally constantly press said sheet, a liftable support for the upper feed member, said support being supported on the upper arm, means controlled by the operator for lifting said support and securing it in the lifted position, a reciprocatory cutter adjacent said feed members and in operative relation with said drive member, means on the upper arm operatively connecting the upper feed member with said drive member for actuating said feed member, and a stationary cutter near the lower feed member, substantially as described.

67. In a machine of the nature described, the combination of a body having arms between which there is a throat, a drive member on the upper arm, a pair of feed rollers standing in opposition to each other at said throat and adapted to receive a sheet between them, a liftable support for the upper feed roller, said support being supported on the upper arm, means controlled by the operator for lifting said support and securing it in the lifted position, a reciprocatory cutter adjacent said feed members and in operative relation with said drive member, means on the upper arm operatively connecting the upper feed roller with said drive member for turning said roller, and a stationary cutter near the lower feed roller, substantially as described.

68. In a machine of the nature described, the combination of a body having arms between which there is a throat, a drive member on the upper arm, a block removably seated on the lower arm, a pair of feed members standing in opposition to each other at the outer side of the reciprocatory cutter path and adapted to receive a sheet between them, the lower feed member being supported on said block, a reciprocatory cutter adjacent said feed members and in operative relation with said drive member, means on the upper arm operatively connecting the upper feed member with said drive member for actuating said feed member, and a stationary cutter near the lower feed member, substantially as described.

69. In a machine of the nature described, the combination of a body having arms between which there is a throat, a drive member on the upper arm, a block removably seated on the lower arm, a pair of feed rollers standing in opposition to each other at the outer side of the reciprocatory cutter path and adapted to receive a sheet between them, the lower feed roller being supported on said block, a reciprocatory cutter adjacent said feed members and in operative relation with said drive member, means on the upper arm operatively connecting the upper feed roller with said drive member for turning said roller, and a stationary cutter near the lower feed roller, substantially as described.

70. In a machine of the nature described, the combination of a body having arms between which there is a throat, a face plate on the upper arm, a block removably seated on the lower arm, a drive member on the upper arm, a pair of feed members standing in opposition to each other at the outer side of said reciprocatory cutter path and adapted to receive a sheet between them, the lower feed roller being supported on said block, a reciprocatory cutter adjacent said feed members and in operative relation with said drive member, means on said face plate operatively connecting the upper feed member with said drive member for actuating said member for feeding, and a stationary cutter near the lower feed member, substantially as described.

71. In a machine of the nature described, the combination of a body having arms between which there is a throat, a face plate on the upper arm, a block removably seated on the lower arm, a drive member on the upper arm, a pair of feed rollers standing in opposition to each other at the outer side of the reciprocatory cutter path and adapted to receive a feed member between them, the lower feed roller being supported on said block, a reciprocatory cutter adjacent said feed rollers and in operative relation with said drive member, means on said plate connecting the upper feed roller with said drive member for turning said roller, and a stationary cutter near the lower feed roller, substantially as described.

72. In a machine of the nature described, the combination of a body having arms between which there is a throat, a drive member on the upper arm, a block removably seated on the lower arm, a pair of feed members standing in opposition to each other at the outer side of said reciprocatory cutter path and adapted to receive a sheet between them, the lower feed roller being supported on said block, a liftable support for the upper feed member, said support being supported on the upper arm, means controlled by the operator for lifting said support, a reciprocatory cutter adjacent said feed members and in operative relation with said drive member, means on the upper arm operatively connecting the upper feed member with said drive member for actuating said feed member, and a stationary cutter near the lower feed member, substantially as described.

73. In a machine of the nature described, the combination of a body having arms between which there is a throat, a drive member on the upper arm, a block removably seated on the lower arm, a pair of feed rollers standing in opposition to each other at the outer side of the reciprocatory cutter path and adapted to receive a sheet between them, the lower feed roller being supported on said block, a liftable support for the upper feed roller, said support being supported on the upper arm, and controlled by the operator for lifting said support, a reciprocatory cutter adjacent said feed members and in operative relation with said drive member, means on the upper arm operatively connecting the upper feed roller with said drive member for turning said roller, and a stationary cutter near the lower feed roller, substantially as described.

74. In a machine of the nature described, the combination of a body having arms between which there is a throat, a face plate on the upper arm, a block removably seated on the lower arm, a drive member on the upper arm, a pair of feed members standing in opposition to each other at the outer side of the reciprocatory cutter path and adapted to receive a sheet between them, the lower feed roller being supported on said block, a liftable support for the upper feed member, said support being supported on said face plate, and means controlled by the operator for lifting said support and securing it in the lifted position, a reciprocatory cutter adjacent said feed members and in operative relation with said drive member, means on the upper arm operatively connecting the upper feed roller with said drive member for turning said roller, and a stationary cutter near the lower feed roller, substantially as described.

75. In a machine of the nature described, the combination of a body having arms between which there is a throat, a face plate on the upper arm, a block removably seated on the lower arm, a drive member on the upper arm, a pair of feed rollers standing in opposition to each other at the outer side of the reciprocatory cutter path and adapted to receive a sheet between them, the lower feed roller being supported on said block, a liftable support for the upper roller, said support being supported by the face plate, means controlled by the operator for lifting said support, a reciprocatory cutter adjacent said feed rollers and in operative relation with said drive member, means on said face plate connecting the upper feed roller with said drive member for turning said roller, and a stationary cutter near the lower feed roller, substantially as described.

76. In a machine of the nature described, the combination of a body having arms between which there is a throat, a drive member on the upper arm, a block removably seated on the lower arm, a pair of feed members standing in opposition to each other at the outer side of the reciprocatory cutter path and adapted to receive a sheet between them, the lower feed roller being supported on said block, a liftable support for the upper feed member, said support being supported on the upper arm, means controlled by the operator for lifting said support and securing it in the lifted position, a reciprocatory cutter adjacent said feed members and in operative relation with said drive member, means on the upper arm operatively connecting the upper feed member with said drive member for actuating said feed member, and a stationary cutter near the lower feed member, substantially as described.

77. In a machine of the nature described, the combination of a body having arms between which there is a throat, a drive member on the upper arm, a block removably seated on the lower arm, a pair of feed rollers standing in opposition to each other at the outer side of the reciprocatory cutter path and adapted to receive a sheet between them, the lower feed roller being supported on said block, a liftable support for the upper feed roller, said support being supported on the upper arm, and means controlled by the operator for lifting said support and securing it in the lifted position, a reciprocatory cutter adjacent said feed members and in operative relation with said drive member, means on the upper arm operatively connecting the upper feed roller with said feed member for turning said roller, and a stationary cutter near the lower feed roller, substantially as described.

78. In a machine of the nature described, the combination of a body having arms between which there is a throat, a drive member on the upper arm, a block removably seated on the lower arm, a pair of feed members standing in opposition to each other at said throat and adapted to receive a sheet between them, a stationary cutter near the lower feed member, the lower feed member and the stationary cutter being supported on said block, a reciprocatory cutter adjacent said feed members and in operative relation with said drive member, and means on the upper arm operatively connecting the upper feed member with said drive member for actuating said feed member, substantially as described.

79. In a machine of the nature described, the combination of a body having arms between which there is a throat, a drive member on the upper arm, a block removably seated on the lower arm, a pair of feed rollers standing in opposition to each other at said throat and adapted to receive a sheet between them, a stationary cutter near the lower feed member, the lower feed member and the stationary cutter being supported on said block, a reciprocatory cutter adjacent said feed members and in operative relation with said drive member, and means on the upper arm operatively connecting the upper feed roller with said feed member for turning said roller, substantially as described.

80. In a machine of the nature described, the combination of a body having arms between which there is a throat, a face plate on the upper arm, a drive member on the upper arm, a block removably seated on the lower arm, a pair of feed members standing in opposition to each other at said throat and adapted to receive a sheet between them, a stationary cutter near the lower feed member, the lower feed member and the stationary cutter being supported on said block, a reciprocatory cutter adjacent said feed members and in operative relation with said drive member, and means on said face plate operatively connecting the upper feed member with said drive member for actuating said member for feeding, substantially as described.

81. In a machine of the nature described, the combination of a body having arms between which there is a throat, a face plate on the upper arm, a drive member on the upper arm, a block removably seated on the lower arm, a pair of feed rollers standing in opposition to each other at said throat and adapted to receive a feed member between them, a stationary cutter near the lower feed member, the lower feed member and the stationary cutter being supported on said block, a reciprocatory cutter adjacent said feed rollers and in operative relation with said drive member and means on said face plate connecting the upper feed roller with said drive member for turning said roller, substantially as described.

82. In a machine of the nature described, the combination of a body having arms between which there is a throat, a drive member on the upper arm, a block removably seated on the lower arm, a pair of feed members standing in opposition to each other at said throat and adapted to receive a sheet between them, a liftable support for the upper feed member, said support being supported on the upper arm, means controlled by the operator for lifting said support, a stationary cutter near the lower feed member, the lower feed member and the stationary cutter being supported on said block, a reciprocatory cutter adjacent said feed members and in operative relation with said drive member, and means on the upper arm operatively connecting the upper feed member with said drive member for actuating the feed member, substantially as described.

83. In a machine of the nature described, the combination of a body having arms between which there is a throat, a drive member on the upper arm, a block removably seated on the lower arm, a pair of feed rollers standing in opposition to each other at said throat and adapted to receive a sheet between them, a stationary cutter near the lower feed member, the lower feed member and the stationary cutter being supported on said block, a liftable support for the upper feed roller, said support being supported on the upper arm, and means controlled by the operator for lifting said support, a reciprocatory cutter adjacent said feed members and in operative relation with said drive member and means on the upper arm operatively connecting the upper feed roller with said drive member for turning said roller, substantially as described.

84. In a machine of the nature described, the combination of a body having arms between which there is a throat, a face plate on the upper arm, a block removably seated on the lower arm, a pair of feed members standing in opposition to each other at said throat and adapted to receive a sheet between them, a liftable support for the upper feed member, said support being supported on said face plate, and means controlled by the operator for lifting said support and securing it in the lifted position, a stationary cutter near the lower feed member, the lower feed member and the stationary cutter being supported on said block, a reciprocatory cutter adjacent said feed members and in operative relation with said drive member, and means on the upper arm operatively connecting the upper feed roller with said drive member for turning said roller, substantially as described.

85. In a machine of the nature described, the combination of a body having arms between which there is a throat, a face plate on the upper arm, a drive member on the upper arm, a block removably seated on the lower arm, a pair of feed rollers standing in opposition to each other at said throat and adapted to receive a sheet between them, a liftable support for the upper roller, said support being supported by the face plate, means controlled by the operator for lifting said support, a reciprocatory cutter adjacent said feed rollers and in operative relation with said drive member and means on said face plate connecting the upper feed roller with said drive member for turning said roller, substantially as described.

86. In a machine of the nature described, the combination of a body having arms between which there is a throat, a drive member on the upper arm, a block removably seated on the lower arm, a pair of feed members standing in opposition to each other at said throat and adapted to receive a sheet between them, a liftable support for the upper feed member, said support being supported on the upper arm, means controlled by the operator for lifting said support and securing it in the lifted position, a stationary cutter near the lower feed member, and the stationary cutter and the lower feed member being supported on said block, a reciprocatory cutter adjacent said feed members and in operative relation with said drive member and means on the upper arm operatively connecting the upper feed member with said drive member for actuating said feed member, substantially as described.

87. In a machine of the nature described, the combination of a body having arms between which there is a throat, a drive member on the upper arm, a block removably seated on the lower arm, a pair of feed rollers standing in opposition to each other at said throat and adapted to receive a sheet between them, a liftable support for the upper feed roller, said support being supported on the upper arm, and means controlled by the operator for lifting and securing it in the lifted position, a stationary cutter near the lower feed member, and the stationary cutter and the lower feed member being supported on said block, a reciprocatory cutter adjacent said feed members and in operative relation with said drive member, and means on the upper arm operatively connecting the upper feed roller with said shaft for turning said roller, substantially as described.

88. In a machine of the nature described, the combination of arms between which there is a throat, an upright, reciprocatory cutter, and two members standing in opposition to each other at the outer side of the path of said cutter and adapted to receive a sheet between them and the upper being driven, for supporting and feeding said sheet and forming a turning point therefor near the path of the reciprocatory cutter, substantially as described.

89. In a machine of the nature described, the combination of arms between which there is a throat, an upright, reciprocatory cutter, and two members standing in opposition to each other at the outer side of the path of said cutter and adapted to receive a sheet between them and the upper being driven, for supporting and feeding said sheet and forming a turning point therefor near the path of the reciprocatory cutter, and a drive member in operative relation with said reciprocatory cutter and with the upper feed member for actuating said cutter and said feed member, substantially as described.

90. In a machine of the nature described, the combination of arms between which there is a throat, an upright, reciprocatory cutter, and two rollers standing in opposition to each other at the outer side of the path of said cutter and adapted to receive a sheet between them, for supporting and feeding said sheet and forming a turning point therefor near the path of the reciprocatory cutter, and means for driving the upper of said rollers, substantially as described.

91. In a machine of the nature described, the combination of arms between which there is a throat, an upright, reciprocatory cutter, and two rollers standing in opposition to each other at the outer side of the path of said cutter and adapted to receive a sheet between them, for supporting and feeding said sheet and forming a turning point therefor near the path of the reciprocatory cutter, and means for driving the upper of said rollers, and a drive member in operative relation with said reciprocatory cutter for reciprocating said cutter and with said upper feed roller for actuating said roller, substantially as described.

92. In a machine of the nature described, the combination of arms between which there is a throat, an upright, reciprocatory cutter, two rollers, standing in opposition to each other at the outer side of the path of said cutter and adapted to receive a sheet between them, for supporting and feeding said sheet and forming a turning point therefor near the path of the reciprocatory cutter, and means for driving the upper of said rollers, substantially as described.

93. In a machine of the nature described, the combination of an upright, reciprocatory cutter having lateral cutting edge portions extending to two lines which are parallel to each other and to the course of the sheet, and two members, standing in opposition to each other at the outer side of the path of the cutter and adapted to receive a sheet between them and one being driven, for supporting and feeding said sheet and forming a turning point therefor near the path of the reciprocatory cutter, substantially as described.

94. In a machine of the nature described, the combination of an upright, reciprocatory cutter having lateral cutting edge portions extending to two lines which are parallel to each other and to the course of the sheet, two members, standing in opposition to each other at the outer side of the path of said cutter and adapted to receive a sheet between them and one being driven, for feeding said sheet and forming a turning point therefor close to the path of the reciprocatory cutter, and sheet-supporting means at each side of the space inclosed between said two parallel lines and adjacent the path of the reciprocatory cutter, substantially as described.

95. In a machine of the nature described, the combination of an upright, reciprocatory cutter having lateral cutting edge portions extending to two lines which are parallel to each other and to the course of the sheet, two members, standing in opposition to each other at the outer side of the path of said cutter and adapted to receive a sheet between them and one being driven, for feeding said sheet and forming a turning point therefor close to the path of the reciprocatory cutter, and a lower cutter located below the sheet plane and extending to each side of the space inclosed between said two parallel lines adjacent the path of the reciprocatory cutter, substantially as described.

96. In a machine of the nature described, the combination of two members, standing in opposition to each other at the outer side of the path of said cutter and adapted to receive a horizontal sheet between them and one being driven, for constantly supporting and frictionally engaging and feeding said sheet and forming a turning point therefor, and an upright, reciprocatory cutter having a path passing through the plane of said sheet near said turning point and having lateral cutting edge portions extending to two lines which are parallel to each other and to the course of the sheet, substantially as described.

97. In a machine of the nature described, the combination of two members, standing in opposition to each other at the outer side of the path of said cutter and adapted to receive a sheet between them and one being driven, for constantly supporting and frictionally engaging and feeding said sheet and forming a turning point therefor, an upright, reciprocatory cutter having a path extending through the plane of said sheet near said turning point, and a lower cutter located below the sheet plane and at the level of the upper portion of the lower feed member and close to said path and having lateral cutting edge portions extending to two lines which are parallel to each other and to the course of the sheet, substantially as described.

98. In a machine of the nature described, the combination of two members, standing in opposition to each other at the outer side of the path of said cutter and adapted to receive a sheet between them and one being rotary and driven, for supporting and feeding said sheet and forming a turning point therefor, and an upright, reciprocatory cutter having a path passing through the plane of said sheet near said turning point and having lateral cutting edge portions extending to two lines which are parallel to each other and to the course of the sheet, substantially as described.

99. In a machine of the nature described, the combination of two members, standing in opposition to each other at the outer side of the path of said cutter and adapted to receive a sheet between them and one being rotary and driven, for supporting and feeding said sheet and forming a turning point therefor, an upright, reciprocatory cutter having a path passing through the plane of said sheet near said turning point, and having lateral cutting edge portions extending to two lines which are parallel to each other and to the course of the sheet and a stationary cutter located below the sheet plane and at the level of the upper portion of the lower feed member and close to said path, substantially as described.

100. In a machine of the nature described, the combination of two rotary members, standing in opposition to each other at the outer side of the path of said cutter and adapted to receive a sheet between them and the one being driven, for supporting and feeding said sheet and forming a turning point therefor, and a reciprocatory cutter having a path passing through the plane of said sheet near said turning point and having lateral cutting edge portions extending to two lines which are parallel to each other and to the course of the sheet, substantially as described.

101. In a machine of the nature described, the combination of two rotary members, standing in opposition to each other at the outer side of the path of said cutter and adapted to receive a sheet between them and one being driven, for supporting and feeding said sheet and forming a turning point therefor, an upright, reciprocatory cutter having a path passing through the plane of said sheet near said turning point and having lateral cutting edge portions extending to two lines which are parallel to each other and to the course of the sheet, and a stationary cutter located below the sheet plane and at the level of the upper portion of the lower rotary feed member and close to said path, substantially as described.

102. In a machine of the nature described, the combination of two rotary members, standing in opposition to each other at the outer side of the path of said cutter and adapted to receive a sheet between them and one being driven, for constantly supporting and frictionally engaging and feeding said sheet and forming a turning point therefor, and an upright, reciprocatory cutter having a path passing through the plane of said sheet near said turning point and having lateral cutting edge portions extending to two lines which are parallel to each other and to the course of the sheet, substantially as described.

103. In a machine of the nature described, the combination of two rotary members, standing in opposition to each other at the outer side of the path of said cutter and adapted to receive a sheet between them and one being driven, for constantly supporting and frictionally engaging and feeding said sheet and forming a turning point therefor, an upright, reciprocatory cutter having a path passing through the plane of said sheet near said turning point and having lateral cutting edge portions extending to two lines which are parallel to each other and to the course of the sheet, and a stationary cutter located below the sheet plane and at the level of the upper portion of the lower feed member and close to said path, substantially as described.

104. In a machine of the nature described, the combination of a stationary cutting member, adjusting screws at each side of said member, an upright, reciprocatory cutting member having lateral cutting edge portions extending to two lines which are parallel to each other and to the course of the sheet, and feed members located at the outer side of the path of said cutter for engaging a sheet and forming a turning point therefor close to the cutting edge of the stationary cutting member, substantially as described.

105. In a machine of the nature described, the combination of an upright, reciprocatory cutter having lateral cutting edge portions extending to two lines which are parallel to each other and to the course of the sheet, two rollers located at the outer side of the path of said cutter and adapted to receive a sheet between them and having their axes parallel to each other and perpendicular to the path of the reciprocatory cutter, and a stationary cutting member located below the sheet plane and being adjustable in a course parallel to the axes of said rollers, substantially as described.

106. In a machine of the nature described, the combination of an upright, reciprocatory cutter having lateral cutting edge portions extending to two lines which are parallel to each other and to the course of the sheet, two rollers adapted to receive a sheet between them, and having their axes parallel to each other and perpendicular to the path of the reciprocatory cutter and the lower of said rollers being adjustable in a course parallel to its axis, and a stationary cutting member below the sheet plane and adjustable in a course parallel to the axes of said rollers, substantially as described.

107. In a machine of the nature described, the combination of an upright, reciprocatory cutter having lateral cutting edge portions extending to two lines which are parallel to each other and to the course of the sheet, an upper feed roller, a shaft located at the outer side of the path of said cutter and supporting said roller, a fixed support below the sheet plane, and a stationary cutting member supported by said support, substantially as described.

108. In a machine of the nature described, the combination of cutting members, a pair of feed rollers, power-actuated means for driving said cutting members and said rollers, and means controllable by the operator and in operative relation with said actuating means and said rollers for setting said actuating means into operation and moving said rollers toward each other, substantially as described.

109. In a machine of the nature described, the combination of feed members for engaging the faces of a sheet and forming a turning point therefor, and cutting members located close to said turning point at the inner side of the plane of said feed members and adapted to cut and move the material of the sheet out of the sheet plane between parallel lines which are parallel to the course of feed of the sheet, substantially as described.

In testimony whereof I have signed my name, in presence of two witnesses, this 5th day of February, in the year one thousand nine hundred and fifteen.

WILLIAM F. SIMPSON.

Witnesses:
WM. BAXTER LEE,
CYRUS KEHR.

Copies of this patent may be obtained for five cents each, by addressing the "Commissioner of Patents, Washington, D. C."